United States Patent
Ku et al.

(10) Patent No.: US 9,262,466 B2
(45) Date of Patent: Feb. 16, 2016

(54) DATA PROCESSOR AND A DATA PROCESSING METHOD

(71) Applicant: INSTITUTE FOR INFORMATION INDUSTRY, Taipei (TW)

(72) Inventors: Yung-Chung Ku, Hsinchu County (TW); Jonathan Tsai, New Taipei (TW); Lee Chung Chen, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 207 days.

(21) Appl. No.: 14/222,641

(22) Filed: Mar. 23, 2014

(65) Prior Publication Data
US 2015/0149422 A1    May 28, 2015

(30) Foreign Application Priority Data
Nov. 25, 2013 (TW) .............................. 102142815 U

(51) Int. Cl.
*G06F 17/30* (2006.01)
(52) U.S. Cl.
CPC .... *G06F 17/30371* (2013.01); *G06F 17/30312* (2013.01)
(58) Field of Classification Search
USPC ......................................... 707/694, 736, 770
See application file for complete search history.

(56) References Cited

U.S. PATENT DOCUMENTS

| | | | |
|---|---|---|---|
| 6,598,119 B2 | 7/2003 | Becker et al. | |
| 7,743,218 B2 | 6/2010 | Guthrie et al. | |
| 2002/0178086 A1 | 11/2002 | Margeson et al. | |
| 2006/0095434 A1* | 5/2006 | McCullough | G06F 17/30902 |
| 2008/0114717 A1* | 5/2008 | Jones | G06F 17/30457 |
| 2012/0010913 A1 | 1/2012 | Lele et al. | |

FOREIGN PATENT DOCUMENTS

| | | |
|---|---|---|
| CN | 103036960 A | 4/2013 |
| EP | 1653381 A3 | 9/2006 |
| TW | 208746 | 7/1993 |
| TW | 526491 B | 4/2003 |
| TW | 596219 A1 | 1/2004 |
| TW | 591442 B | 6/2004 |
| TW | 200538972 | 12/2005 |
| TW | 201308946 A1 | 2/2013 |
| WO | WO2004031964 A3 | 4/2004 |
| WO | WO2012096846 A3 | 7/2012 |

OTHER PUBLICATIONS

Taiwan Patent Office, Office action issued on May 8, 2015.

* cited by examiner

*Primary Examiner* — Hung T Vy
(74) *Attorney, Agent, or Firm* — Li & Cai Intellectual Property (USA) Office

(57) ABSTRACT

A data processor and a data processing method are provided. The data processor is arranged between a client and a database system to determine in advance whether a user instruction sent from the client updates data of the database system. When the data processor determines that the user instruction does not update data of the database system, the data processor sends the predefined data to the client and restrains the user instruction to the database system. Accordingly, the data processor can assist the database system to process the user instruction, so as to reduce in advance the enormous volume of data processing that the database system is requested upon.

16 Claims, 10 Drawing Sheets

12A

Seating (☐Available ▓Booked ▨Your Selection)

Screen

|   | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|

A, B, C, D, E, F, G, H

Confirm

Other showing | Start over

Cinema: XX cinema
Movie: ○○○○
Date: 10/31
Showing: 12:40
Seating: E06, E07, E08, E09

Please select the method of payment:

⦿ Credit card/Debit card with discount reservation

○ Standard price reservation

Next

FIG.6D

DATA PROCESSOR AND A DATA PROCESSING METHOD

BACKGROUND

1. Technical Field

The instant disclosure relates to a data processor and a data processing method; in particular, to a data processor and a data processing method for improving the loading capacity of a database system.

2. Description of Related Art

In terms of database systems, processing instructions or data are inherently time consuming. Each time the database system processes an instruction or command or data, time is consumed by the database system. Take a ticket reservation system as an example, when a user provides a request for ticket reservation in the ticket reservation system, the system sends a ticket reservation request to the database system such that the database system can update or confirm data in the database according to the ticket reservation request. Whether or not the ticket request updates the data in the database, the request provided by the user will be sent to and executed in the database system, thus time and resources of the database system are ineffectively consumed.

If the database system is applied in a larger public setting, which is available for a larger quantity of users (for example. 10,000 users and above), such as a movie ticket reservation system, and the 10,000 users simultaneously send instructions such as ticket reservations, returns, and modification requests to the database system, the database system has to process the enormous volume of data simultaneously. If the database system is overloaded, the system is prone to crashing. Typically, additional hardware or revision of software commands in the database system is required to enhance loading capacity of the database system, however, both of which increase operational costs.

Moreover, when an enormous volume of instructions swamps the database system, the database system is still required to process the instructions whether or not the instructions will update the data (such as whether or not to reserve tickets) in the database system. The indiscriminating database system will lead to relatively low processing efficiency such that instructions which are not necessary for execution will affect the execution of the relatively more preferred instructions. For example, during ticket reservation, a certain amount of tickets are no longer available for sale, yet the ticket reservation system still processes the instructions requesting for the tickets that are no longer available. Thus, users who wish to request for available tickets is prevented from smoothly accessing the ticket reservation system, which is inconvenient to other users. If the processing can be made in advance between the client and the database system to block ticket reservations for tickets that are clearly not available, the overall load of the database system can be reduced while enhancing the processing speed of the available ticket reservations instructions.

To address the above issues, the inventor strives via associated experience and research to present the instant disclosure, which can effectively improve the limitation described above.

SUMMARY

The instant disclosure provides a data processor linked between a client and a database system. The database system has a plurality of data. The data processor includes an instruction unit and a decision unit. The instruction unit receives user instructions from the client, decodes and analyzes the user instruction according to the instruction syntax, and correspondingly generates analytical result. The decision unit is linked between the instruction unit and the database system. The decision unit has cache data, and the decision unit determines whether at least one piece of data in the database system is to be updated according to the cache data and the analytical result. The cache data records whether at least one piece of data in the database system is updated according to a previous user instruction result. The decision unit returns a predefined message to the client and restrains the user instruction to the database system when the decision unit determines that the data in the database system is not to be updated according to the user instruction.

The instant disclosure also provides a data processing method compatible with the aforementioned data processor. The data processor is linked between the client and the database system. The data processor includes an instruction unit and a decision unit. The data processing method is as follow: receiving a user instruction sent from the client, analyzing the user instruction according to instruction syntax, and generating an analytical result. Then determining whether at least one piece of data in the database system is to be updated according to cache data and the analytical result. The cache data records whether at least one piece of data in the database system is updated according to a previous user instruction result. If the at least one piece of data is not updated by the user instruction, returning a predefined message to the client and restraining the user instruction to the database system.

In summary, the data processor and the data processing method in accordance with the embodiments of the instant disclosure can reduce the overloading of the database system due to simultaneously processing an enormous volume of data, and in turn enhance the loading capacity of the database.

In order to further understand the instant disclosure, the following embodiments and illustrations are provided. However, the detailed description and drawings are merely illustrative of the disclosure, rather than limiting the scope being defined by the appended claims and equivalents thereof.

BRIEF DESCRIPTION OF THE DRAWINGS

FIG. 6A-6E are schematic diagrams illustrating a client applying the data processor of a database system to reserve a movie ticket in accordance with an embodiment of the instant disclosure.

DETAILED DESCRIPTION OF THE EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

The instant disclosure provides a data processor and a data processing method. The data processor is linked between a client and a database system. The client (such as terminal devices, electronic devices, computers, etc.) can generate and send user instructions to the database system in order to request the execution of the user instruction. The data processor and the data processing method can determine or determine in advance whether or not the user instruction sent from the client will update at least one piece of data in the database system. If the user instruction is determined to not update the at least one piece of data in the database system, a predefined message will be sent to the client while the user instruction will not be sent to the database system. In other words, as long as the user instruction updates the data in the database system, the user instruction will be sent to the database system for processing. The data processor and the method of processing the data thereof can facilitate the processing of user instructions for the database system, such that the loading for simultaneously processing a large volume of data by the database system is reduced and the loading capacity of the database system is relatively enhanced.

Figure 1:
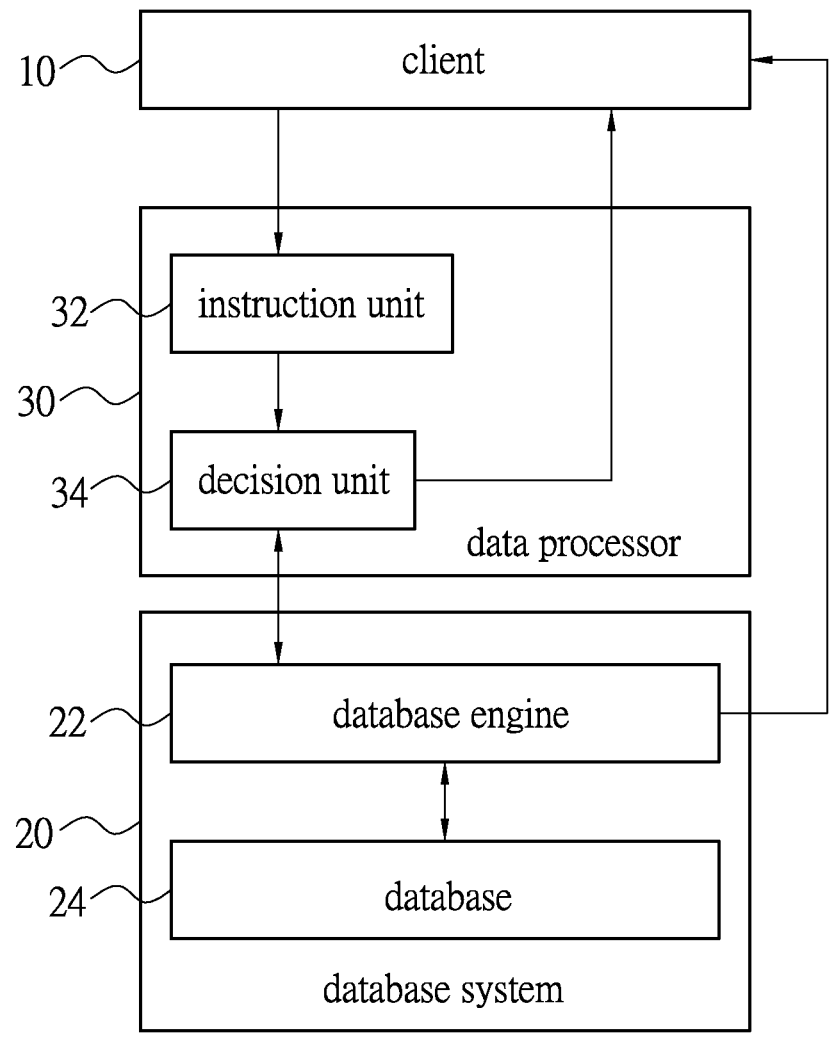
FIG. 1 is a schematic diagram of a data processor illustrating the connections between a client and a database system in accordance with an embodiment of the instant disclosure.

Please refer to FIG. 1 as the schematic diagram of a data processor illustrating the connections between a client and a database system in accordance with an embodiment of the instant disclosure. A data processor 30 of the instant disclosure is linked between a client 10 and a database system 20 including a plurality of databases. Notably, the term "linked" refers to an indirect or direct electrical connection, whether wired or wirelessly connected to the internet, or a connection via a relay device, or the combination thereof.

In the instant embodiment, the client 10 can be of any user devices (such as portable electronic devices, computers, public information workstations, interactive multimedia kiosks KIOSK or other mid-range devices, etc.). The data processor 30 receives the user instruction or instructions sent from the client 10 and are further determined whether at least one piece of data of the database system 20 will be updated according to a plurality of user instructions sent from a plurality of clients. If the user instruction does not update the at least one piece of data of the database system 20, the data processor 30 will not send the user instruction to the database system 20, and will send a predefined message to the client 10. Whether or not the user instruction will update at least one piece of data in the database system 20 is determined according to whether or not a previous user instruction result had already updated data in the database system, the determination of the update is captured or recorded by cache data.

The data processor 30 includes an instruction unit 32 and a decision unit 34. The instruction unit 32 receives the use instruction sent from the client 10, analyzes the user instructions based on the instruction syntax, and generates analytical result corresponding to the user instruction to the decision unit 34. The analytical result is sent to the decision unit 34. The instruction syntax used in the instant embodiment is structured query language (SQL). SQL instruction syntax is commonly used in instruction syntax, thus is not furthered disclosed. Other instruction syntaxes compatible with the implementation of ANSI SQL can also be used. Moreover, the instruction syntax of the instant embodiment is not limited to the examples provided herein.

The decision unit 34 is linked between the instruction unit 32 and the database system 20. The decision unit 34 also includes cache data. The decision unit 34 determines whether or not the user instruction updates at least one piece of data in the database system 20 according to the cache data and the analytical result. The cache data captures or records whether or not the previous user instruction result updated at least one piece of data. In one embodiment, the cache data can also records not only one but also a plurality of the previous user instruction results. In the instant embodiment, the cache data is stored in a storage device in the decision unit 34. The physical size, memory size, and types of the storage device in the decision unit 34 are not limited.

In an embodiment, the data processor is applied in a ticket reservation system. The reserved ticket does not require a specific seat, showing, or other special information but only the quantity of ticket is limited. The data stored in the database system 20 can be the quantity of reserved tickets. The cache data can record the quantity of sold tickets. For example, when the first "reserved ticket" instruction is successfully executed, the quantity of available tickets is reduced such that data in the database system 20 is updated, the cache data then records the quantity of available tickets remains. Successively, when the next requested user instruction is also for "reserving ticket", the decision unit 34 determines to update data (the quantity of available tickets at which time) in the database system 20 according to the cache data. The decision unit 34 then sends the "reserving ticket" user instruction to the database system 20 in order to execute the instruction. If no data recorded in the cache data illustrates available seating, for example, when the next user instruction is also for "reserving ticket", the decision unit 34 determines to not update data (the quantity of available tickets). The decision unit 34 will not send the "reserving ticket" instruction to the database 20 for execution of the instruction. Not until other user instructions such as "ticket returns" are sent to the database system 20 and update the data in the database will the decision unit 34 determine to update the next "reserving ticket" user instruction as updated data.

In another embodiment, another ticket reservation system requires the seating (can also require other variables such as specific showing, or other relevant information) of the reserved tickets to be specified. The database system 20 stores data, specific seating or seats in the instant embodiment, at which time, the cache data can capture a result packet on whether the previous data of specific seating has been updated. For example, when the previous "reserve seat A" instruction is executed, which indicates the seat A is sold, the data in the database system 20 is updated and the cache data records the seat A is sold such that the seat A is no longer available for sale. When another user then chooses to "reserve seat A", the decision unit 34 determines the seat A is no longer available according to the cache data (data in database system will not be updated) and the cache data still has the record the seat A is no longer available for sale. The "reserve seat A" instruction will not be sent to the database system 20. As aforementioned, the cache data can capture the previous one or more than one record on whether or not the data in the database system 20 has been updated according to the results corresponding to the user instruction (i.e., the user instruction results). Furthermore, the cache data can also capture associate information regarding the previous record or records of updated data in the database system 20. In another embodiment, the cache data can directly record "seats with non-updated data in database system" and compare the "seats with non-updated data in records of the cache data" with the specific seating or seats in the user instruction when the decision unit 34 is determining whether the user instruction will update the data in the database system. If the specific seat matches one of the "seats with non-updated data in database", the specific seat will not lead to the data to update in the database system.

If the decision unit 34 determines that the user instruction will not update the data in the database system 20, the decision unit 34 will send the predefined message to the client 10. Moreover, the predefined message can be sent from the decision unit 34 and can be generated based on the cache data to inform the client 10 about one of the previously updated data in the database system while the decision unit 34 will not send the user instruction to the database system 20.

If the decision unit 34 determines that the user instruction will update at least one piece of data in the database system 20, the decision unit 34 will send the user instruction to the database system 20 for processing. Meanwhile, the database system 20 will generate and send result packet to the client 10 and the decision unit 34, such that the client 10 is informed of the current status of the data in the database system. The decision unit 34 then updates the cache data according to the result packet such that the cache data has one or more previous records of at least one updated data in the database system 20 (i.e., the previous user instruction results). In the instant embodiment, the database system 20 includes a database engine 22 and databases 24. The database engine 22 is linked to the decision unit 34. The database engine 22 is used for processing according to the user instruction, generates and returns the result packet to the client 10 and the decision unit 34. Moreover, the databases 24 are used for storing data.

Notably, the instruction unit 32 and the decision unit 34 can be incorporated into a single chip in order to provide the data processor 30, but not limited hereto. For example, the instruction unit 32 and the decision unit 34 can also be different network nodes. Different network nodes can execute functions of the instruction unit 32 and the decision unit 34 via software or hardware in order to provide the aforementioned data processor 30.

The following is an example illustrating the user instruction in basic SQL instruction syntax.

UPDATE table_name
SET {column_name = expression} [, ...]
[WHERE condition]

The instruction unit 32 can analyze the user instructions above according to SQL instruction syntax and generate corresponding analytical result. ⌈UPDATE⌋, ⌈SET⌋, and ⌈WHERE⌋ for example are typical instruction syntaxes of SQL to provide the decision unit 34 comparison between contents described in ⌈condition⌋ and the cache data in order to determine whether or not to update data in ⌈SET⌋ and then replace at least one piece of data in the database system 20. After the decision unit 34 compares the contents described in ⌈condition⌋ with the cache data, the user instruction is assessed to determine whether or not the at least one of the data in the database of the database system 20 will be updated. Meanwhile, the decision unit 34 sends the aforementioned user instruction to the database system 20. After the decision unit 34 compares the described contents in ⌈condition⌋ with the cache data, if portions or the entire cache data match the described contents of ⌈condition⌋ and if the decision unit 34 determines the user instruction will not update at least one piece of data in the databases system 20, the decision unit 34 will not send the user instruction to the database system 20, but will send the predefined message to the client 10.

Figure 2:
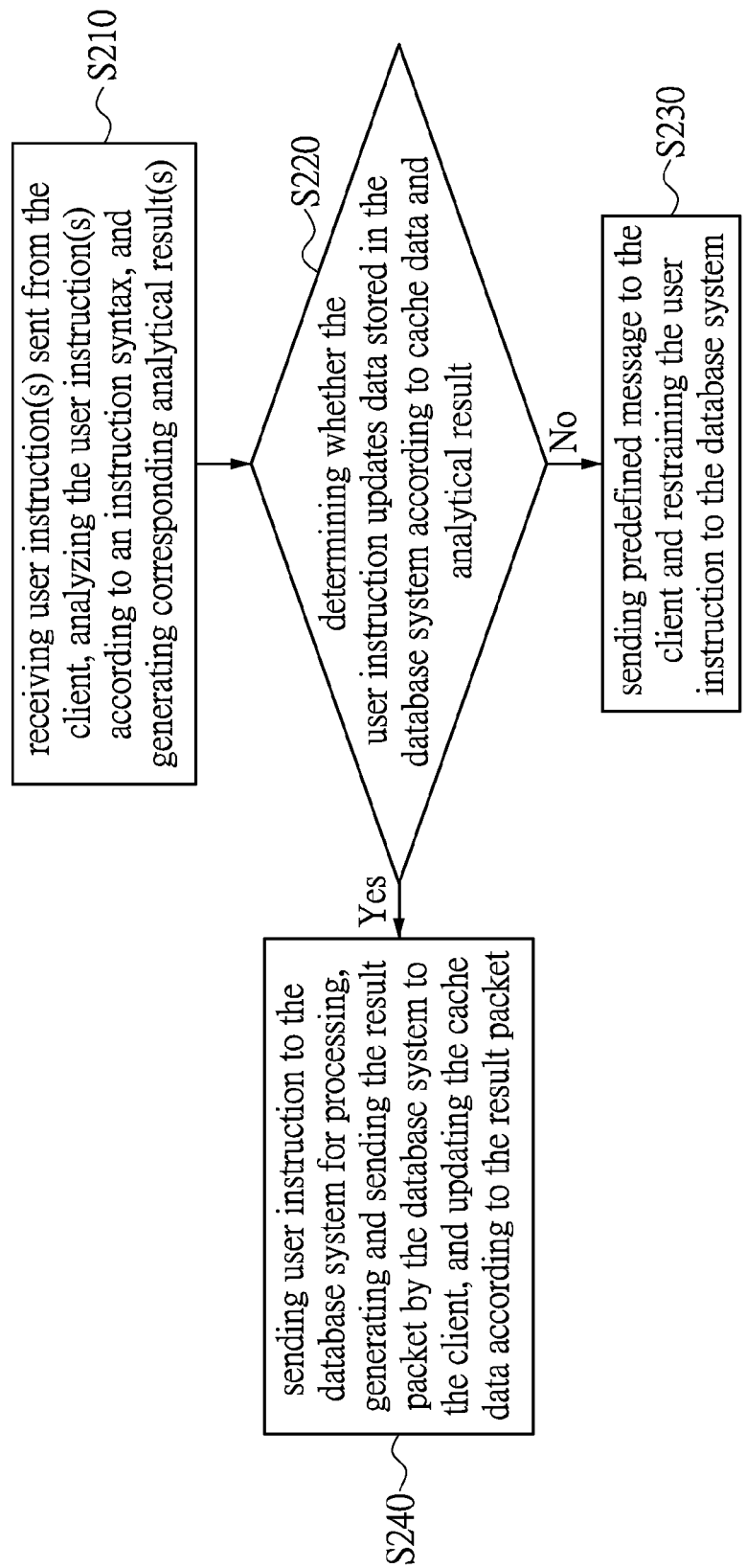
FIG. 2 is a process flow diagram of a data processing method in accordance with an embodiment of the instant disclosure.

Please refer to FIGS. 1 and 2 which illustrate the data processing method of the instant disclosure after the data processor 30 received the user instruction sent from the client 10. FIG. 2 is a process flow diagram of a data processing method in accordance with an embodiment of the instant disclosure. In step S210, the instruction unit 32 receives the user instruction sent from the client 10, analyzes the user instruction via the instruction syntax, and correspondingly generates analytical result to the decision unit 34. The decision unit 34 then determines whether or not the user instruction updates data in the database system 20 according to the cache data and the analytical result (Step 220). If the decision unit 34 determines that the user manual will not update the data in the database system 20, the decision unit 34 will sent the predefined message to the client based on the cache data, such that the client 10 is informed about the current status of the data in the database system 20. Meanwhile, the decision unit 34 will not send the user instruction to the database system 20 (Step 230). If the decision unit 34 determines the user instruction updates the data in the database system 20, the decision unit 34 will send the user instruction to the database system 20 for processing. The database system 20 will generate and send the result packet to the client 10 and the decision unit 34. The decision unit 34 will update the cache data according to the result packet, such that the cache data at the moment identifies with the updated data in the database system 20 (Step S240).

When the user instruction sent by the client 10 is determined to not update the data in the database system 20, the decision unit 34 will not send the user instruction to the database system 20 to facilitate the processing of the user instruction, and reduce loading of the database system 20 from simultaneously processing an enormous volume of data. In the conventional database systems, the conventional database system will receive the user instruction whether or not the user instruction sent from the client will update the data in the database system. As a result, a large volume of data will be simultaneously processed which can cause the conventional database system to crash.

Figure 3:
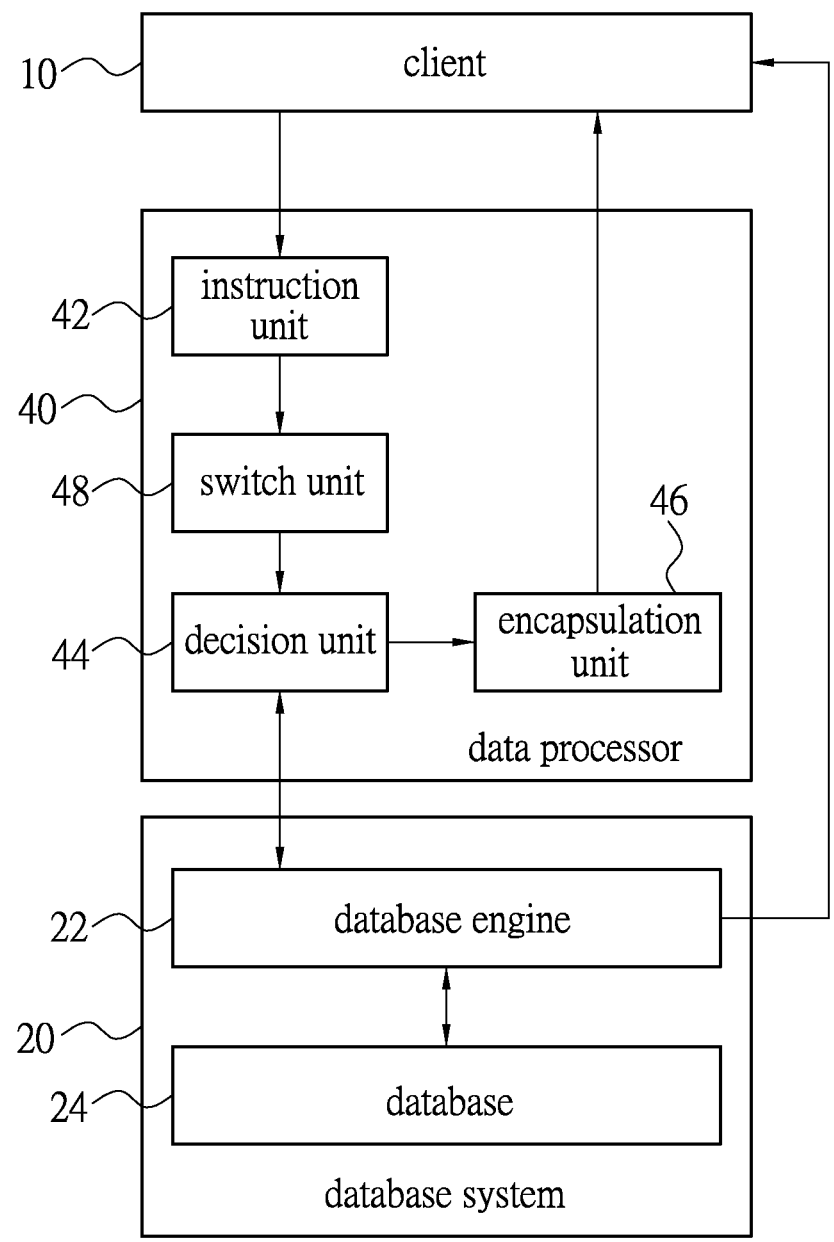
FIG. 3 is a schematic diagram of the data processor illustrating the connections between a client and a database system in accordance with another embodiment of the instant disclosure.

Please now refer to FIG. 3 as the schematic diagram of the data processor illustrating the connections between a client and a database system in accordance with another embodiment of the instant disclosure. The data processor 40 of the instant embodiment is linked between the client 10 and the database system 20. The database system 20 has a plurality of data. In the instant embodiment, the client 10 can be communication connections connected to user devices (such as portable computing devices, computer, etc.), such that the data processor 40 can, via the client 10, receive requests from multiple user devices (user instructions) and then determine whether the requests will update data in the database system 20. The functions and operation modes of database system 20, the database engine 22, and the database 24 as shown in FIG. 3 are disclosed in previous embodiment and are not further disclosed herein.

The data processor 40 includes the instruction unit 42, the decision unit 44, the switch unit 48, and an encapsulation unit 46. The instruction unit 42 is linked between the client 10 and the switch unit 48. The decision unit 44 is linked between the switch unit 48 and the database system 20. The encapsulation unit 46 is linked between the decision unit 44 and the client 10. Further details are not disclosed here due to the similarities in function and operation modes between the instruction unit 42 and the decision unit 44 of the instant embodiment, and the instruction unit 32 and the decision unit 34 of the previous embodiment as shown in FIG. 1.

Notably, the encapsulation unit 46 of the instant embodiment uses protocol to encapsulate or package the predefined message received as a predefined message packet and to send the predefined message packet to the client 10. The client 10 decodes or unpacks the predefined message packet in order to obtain the predefined message, such that the client 10 can receive result packet from the predefined message. As a result, the result packet is equivalent to the current processed data in the database 20 obtained after the user instruction has been processed. In the instant embodiment, the protocol can be TCP/IP protocol, USB protocol, or other typical protocol used for data transfer. However, the protocol can also be customizable, as long as the client 10 can decodes or unpacks the predefined message packet to obtain the predefined message, and is not limited to the examples provided herein.

Moreover, the switch unit 48 of the instant embodiment determines whether or not to activate the decision unit 44. The data processor 40, via the switch unit 48, determines whether or not to activate the decision unit 44 in order to determine functions of the user instruction. If the switch unit 48 is set to activate the decision unit 44, the decision unit 44 determines whether the user instruction will update data in the database system 20 according to the cache data and the analytical result. If the switch unit 48 is set to not activate the decision unit 44, the switch unit 48 will directly send the analytical result to the database system 20 for processing similar to that of the conventional communication method between a client and a typical database system.

In the instant embodiment, the switch unit 48 has a configuration form for setting configurations including whether the switch unit 48 is activated the decision unit 44, and the switch unit 48 determines whether or not to activate the decision unit 44 based on the configurations. The configurations can further include communication protocols between the decision unit 44 and the database system 20, such that the data processor 40 can send and receive data in response to various database systems (such as airline ticket database systems, movie ticket database systems, etc.).

Furthermore, the user instruction can also include instruction comments, such that the switch unit 48 can determine whether or not to activate the decision unit 44 according to the instruction comments. In addition, the instruction unit 42 can analyze the user instruction based on the instruction syntax while determining the activation of the decision unit 44 via the instruction comments in the user instruction. Moreover, the switch unit 48 of the instant embodiment can be linked between the client 10 and the instruction unit 42 (not shown in figures), such that the activation of the decision unit 44 is set before the instruction unit 42 analyzes the user instruction according to the instruction syntax. The switch unit 48 can also provide a feature option to the client 10 in order to provide options for the system manager at the client 10 or users to decide the activation of the decision unit 44. The system manager or the users can decide whether or not to apply the data processor 40 of the instant disclosure.

Figure 4:
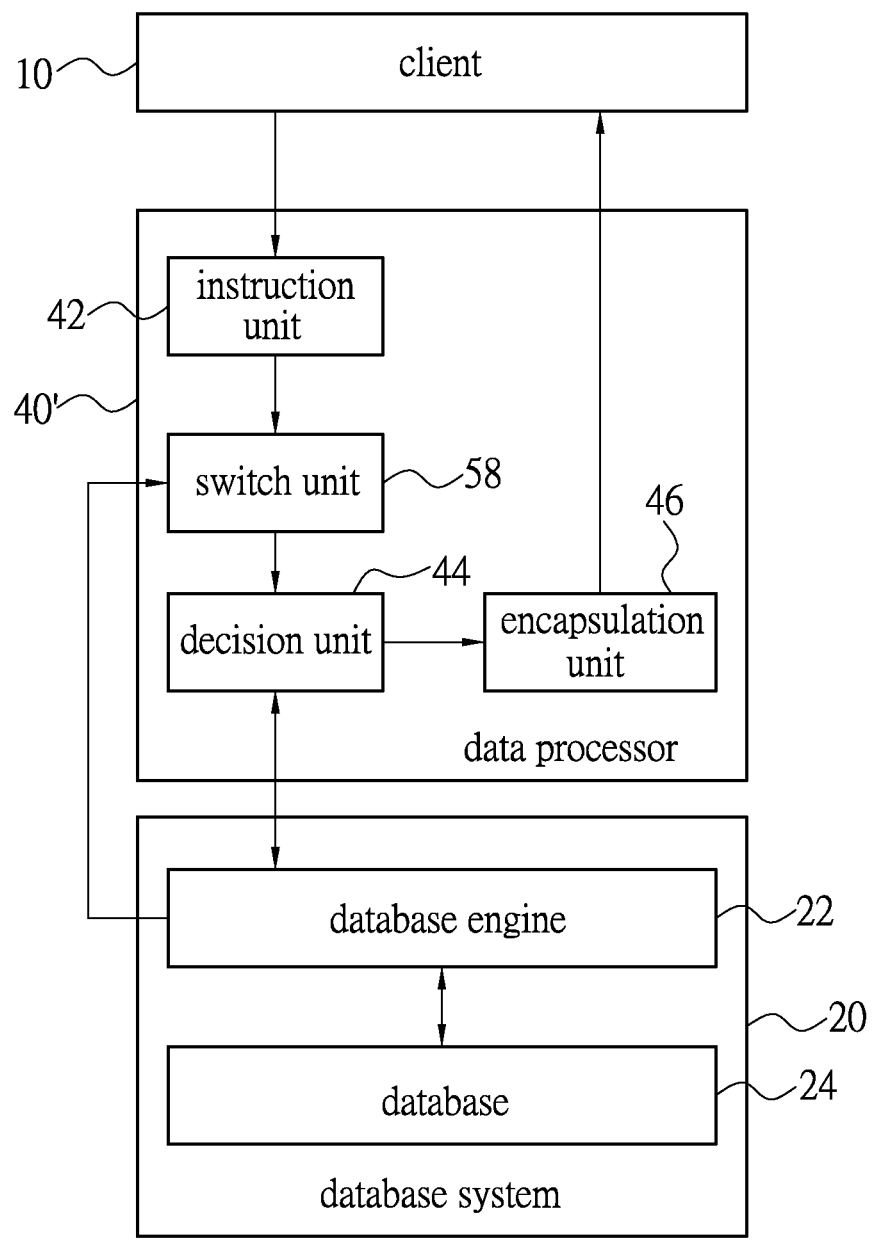
FIG. 4 is a schematic diagram of the data processor illustrating the connections between a client and a database system in accordance with another embodiment of the instant disclosure.

Please refer to FIG. 4 as the schematic diagram of the data processor illustrating the connections between a client and a database system in accordance with another embodiment of the instant disclosure. The data processor 40' includes the instruction unit 42, the decision unit 44, the encapsulation unit 46, and the switch unit 58. The switch unit 48 in FIG. 4 differs from FIG. 3 in that the linked connection is between the instruction unit 42 and the decision unit 44 instead. The switch unit 58 in FIG. 4 is separately linked to the instruction unit 42, the decision unit 44, and the database system 20, such that the switch unit 58 can be controlled by the database system 20 in order to determine the activation of the decision unit 44.

Figure 5:
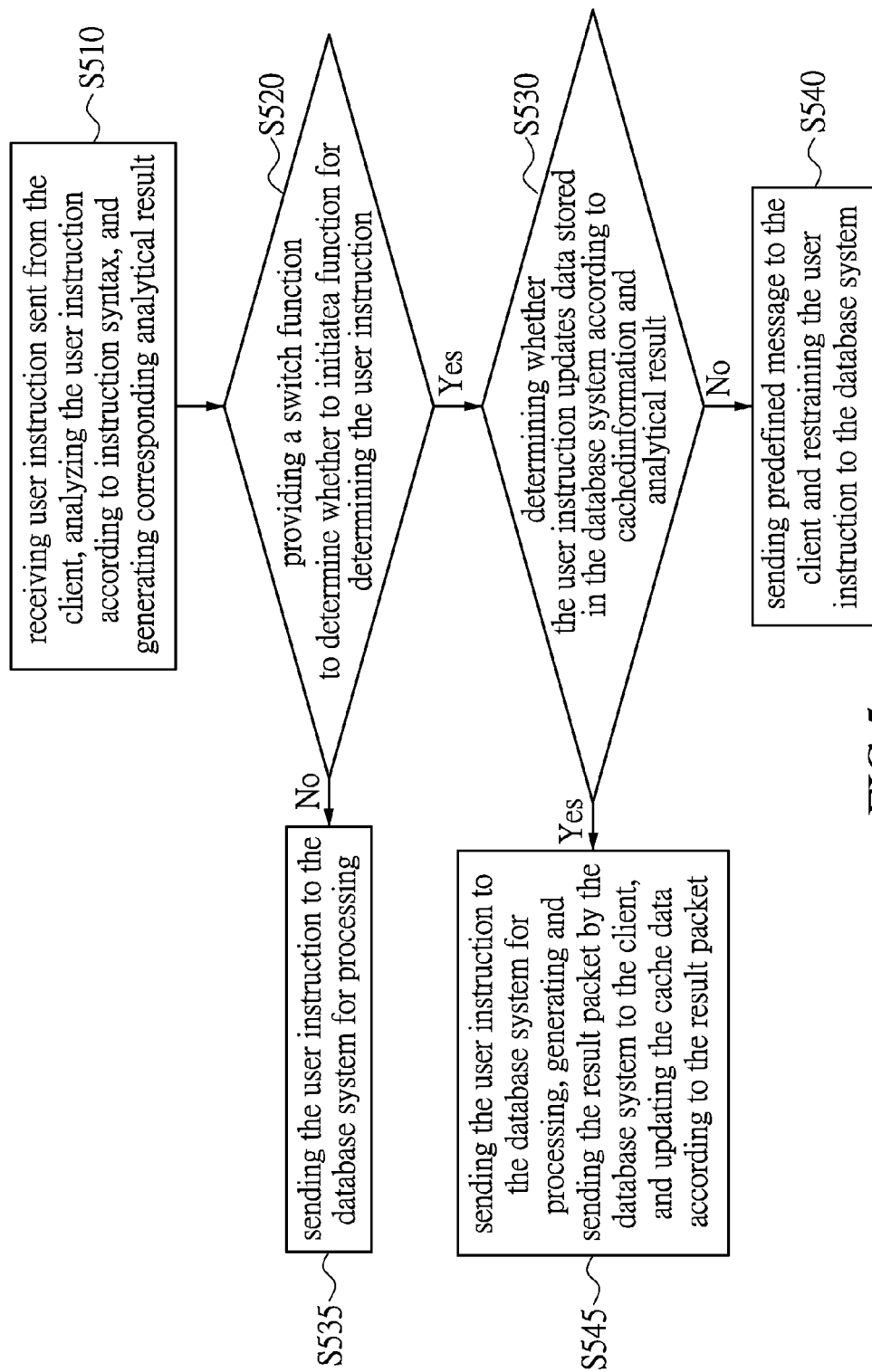
FIG. 5 is a process flow diagram of the data processing method in accordance with another embodiment of the instant disclosure.

Please refer to FIGS. 3 and 5. The data processor 40 in FIG. 3 is further described to illustrate the data processing method after the user instruction sent from the client 10 is received. FIG. 5 is a process flow diagram of the data processing method in accordance with another embodiment of the instant disclosure. After the instruction unit 42 received the user instruction sent from the client 10, the instruction unit 42 analyzes the user instruction according to the instruction syntax, and generates the analytical result to the decision unit 44 (Step S510). The switch unit 48 provides a switch function in order to determine whether or not to initiate a function for determining the user instruction (S520). If the switch unit 48 is set to not activate the decision unit 44, the switch unit 48 directly sends the analytical result to the database system 20 for processing similar to the conventional communication method between a client and a typical database system (Step 535). If the switch unit 48 is set to activate the decision unit 44, the decision unit 44 determines whether the user instruction updates the data in the database system 20 according to the cache data and the analytical result (Step S530). If the decision unit 44 determines that the user instruction does not update the data in the database system 20, the decision unit 44 sends the predefined message to the client 10 according to cache data, such that the client 10 is informed of the current status of the data in the database system 20. Meanwhile, the decision unit 44 does not send user instruction to the database system 20 (Step S540). If the decision unit 44 determines that the user instruction updates the data in the database system 20, the decision unit 44 sends the user instruction to the database system 20 for processing. The database system 20 then generates and sends the result packet to the client 10 and the decision unit 44. The decision unit 44 then updates the cache data with the result packet, such that the current cache data and the updated data in the databases are identical (Step S545).

As aforementioned, if the switch unit 48 is set to activate the decision unit 44 and the user instruction sent by the client 10 does not update the data in the database system 20, the decision unit 34 will not send the user instruction to the database system 20 in order to facilitate the processing of the user instruction, and to reduce the enormous amount of data being simultaneously processed by the database system 20.

The following example discloses the usage of the database system 20 to reserve movie tickets with a movie ticket reservation system by a user at a client 10. Please refer to 6A, the data processor at the client 10, the data processor 30, and the database system 20 are communicably interconnected and linked to form a ticket reservation system. The user is communicably connected to the ticket reservation system via the client 10. The client 10 includes a display 12A, which shows information regarding ticket reservation such as movie, cinema, date, showing, and ticket quantity choices (user sends user instruction to the data processor 30 via the client 10) as shown in FIG. 6B.

Figure 6A:
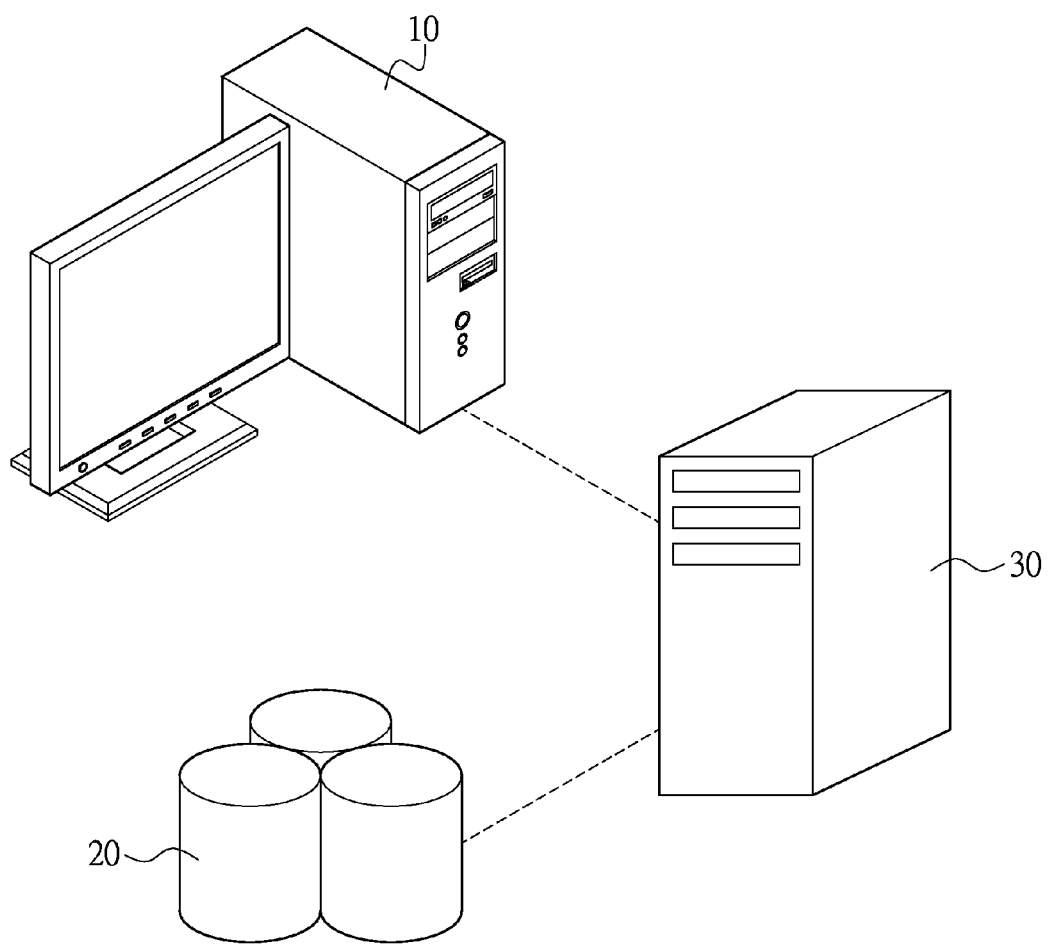

The display 12A of the client 10 displays seating information to provide seating selections of a chosen movie (for example: seats E06, E07, E08, and E09 are selected by users) as shown in FIG. 6C.

Figure 6B:
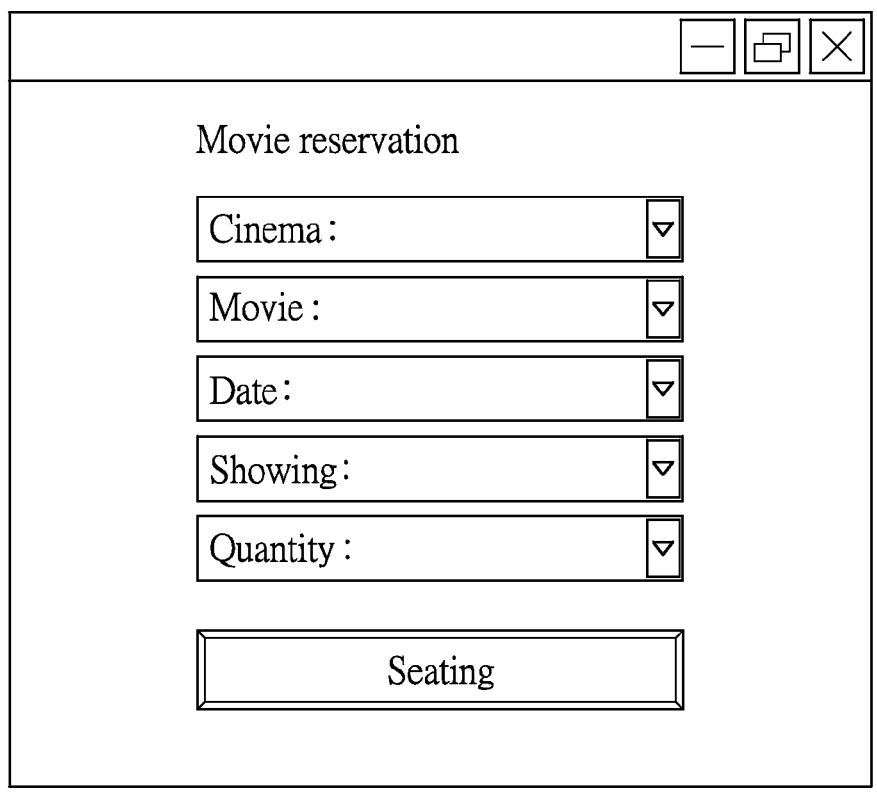
Figure 6E:

The user can then select the "Confirm" seating option, "Other showing" option, or "Start over" option as shown in FIG. 6B. If the user selects the "Confirm" seating option, the display 12A at the client 10 will then display the "method of payment" as shown in FIG. 6D. If the user then selects the "Credit card/Debit card with discount reservation" option, in other words, the user confirms that the user instruction for reserving tickets is to be sent. The data processor 30 then determines that the user instruction will update the data in the database system 20. Successively, the data processor 30 will send the user instruction to the database system 20, and the data in the database system 20 will be updated accordingly. Then the display 12A at the client 10 will display relevant information regarding the completion and successful ticket reservation as shown in FIG. 6E.

Thus, when the user confirms ticket reservation (user instruction is sent), the data processor 30 assists the database system to determine or make a decision on whether or not the user instruction will update the data in the databases system 20. For example: By comparing resultant data in the cache data on whether another ticket reservation instruction is identical to the already selected ticket reservation instruction having the same seating or showing. If the data are identical, another user will not be allowed to make a ticket reservation. Since the ticket reservation instruction will not update data in the database system 20, the predefined message (such as Reservation unsuccessful, or seating not available) will be sent to inform the user. If the resultant data in the cache data is not identical to the seating or showing selection under a ticket reservation instruction, the user can make such a reservation and the ticket reservation instruction will update the data in the database system 20. The data processor 30 then sends the user instruction to the database system 20 and updates the data therein. In the conventional ticket reservation system, whether or not the user instruction will be updated, the database system 20 will still receive the user instruction. In contrast to the conventional system, the data processor 30 of the instant disclosure can intercept user instruction or instructions when the user instruction is determined to not update the data in the databases in order to reduce the load of the database system 20 simultaneously processing an enormous volume of data.

In summary, the data processor and the data processing method in accordance with the embodiments of the instant disclosure is linked between at least one client and a database system in order to determine in advance whether or not the user instruction will update at least one piece of data in the database system. If the data processor determines that the user instruction will not update the at least one piece of data in the database system, the data processor will send relevant information or data to the client and the user instruction will not be sent to the database system for processing. The data processor and the data processing method of the instant disclosure can assist the database system in processing user instructions in order to reduce the heavy load that the database system bears by processing an enormous volume of data simultaneously, and in turn reduce crashing of the database system.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A data processor linked between a client and a database system having a plurality of data, comprising:
   an instruction unit receiving a user instruction from the client, decoding and analyzing the user instruction according to an instruction syntax, and correspondingly generating an analytical result; and
   a decision unit linked between the instruction unit and the database system, the decision unit having a cache data, wherein the decision unit determines whether at least one piece of data in the database system is to be updated according to the cache data and the analytical result, the cache data records whether at least one piece of data in the database system is updated according to a previous user instruction result;
   wherein the decision unit returns a predefined message to the client and restrains the user instruction to the database system when the decision unit determines that the data in the database system is not to be updated according to the user instruction.

2. The data processor as recited in claim 1, wherein the decision unit sends the user instruction to the database system for processing if the decision unit determines whether at least one piece of data in the database system is to be updated, the database system generates and returns a result packet to the client and the decision unit, and the decision unit sets the cache data according to the result packet.

3. The data processor as recited in claim 1 further comprising:
   an encapsulation unit linked between the decision unit and the client, the encapsulation unit packaged the predefined message according to a protocol as a predefined message packet, the encapsulation unit returned the predefined message packet to the client;
   wherein the client decodes the predefined message packet to obtain the predefined message.

4. The data processor as recited in claim 1 further comprising:
   a switch unit linked between the instruction unit and the decision unit for determining the activation of the decision unit;
   wherein if the switch unit is set to activate the decision unit, the decision unit determines whether at least one piece of data in the database system is to be updated according to the cache data and the analytical result;
   wherein if the switch unit is set to deactivate the decision unit, the user instruction is sent to the database system for processing.

5. The data processor as recited in claim 4, wherein the switch unit is further linked to and controlled by the database system to set whether the decision unit is to be activated.

6. The data processor as recited in claim 4, wherein the switch unit has a configuration form for setting configurations including whether the switch unit activated the decision unit.

7. The data processor as recited in claim 4, wherein the user instruction further comprising:
   an instruction comment, wherein the switch unit sets whether to activate the decision unit according to the instruction comment.

8. The data processor as recited in claim 1, wherein the database system includes a database engine and a database, the database engine processes and generates a result packet according to the user instruction, the database engine sends the processed data to the client and the decision unit, the database stores the data in the database, and the decision unit is linked to the database engine.

9. A data processing method for a data processor, the data processor linked between a client and a database system having a plurality of data, comprising the steps of:
   receiving a user instruction sent from the client, analyzing the user instruction according to an instruction syntax, and generating an analytical result; and
   determining whether at least one piece of data in the database system is to be updated according to a cache data and the analytical result;
   wherein the cache data records whether at least one piece of data in the database system is updated according to a previous user instruction result, if the at least one piece of data is not updated by the user instruction, returning a predefined message to the client and restraining the user instruction to the database system.

10. The data processing method as recited in claim 9 further comprising:
sending the user instruction to the database system for processing, generating and sending a result packet from the database system to the client, and updating the cache data according to the result packet if the user instruction is determined to update the at least one piece of data in the database system.

11. The data processing method as recited in claim 9 further comprising:
packaging the predefined message according to a protocol as a predefined message packet, and returning the predefined message packet to the client;
wherein the client decodes the predefined message packet to obtain the predefined message.

12. The data processing method as recited in claim 9 further comprising:
providing a switch function to determine whether to activate a function for determining the user instruction;
wherein if the switch function determines to activate the function for determining the user instruction, the user instruction is assessed to determine whether at least one piece of data in the database system is to be updated according to the cache data and the analytical result, if the switch function determines to not activate the function for determining the user instruction, the user instruction is sent to the database system directly for processing.

13. The data processing method as recited in claim 12, wherein the switch function is controlled by the database system for determining whether to activate the function for determining the user instruction.

14. The data processing method as recited in claim 12, wherein the switch function has a configuration form for setting configurations including whether the switch function activated the function for determining the user instruction.

15. The data processing method as recited in claim 12, wherein the user instruction further includes an instruction comment, the data processing method further comprising:
determining whether to activate the function for determining the user instruction according to the instruction comment.

16. The data processing method as recited in claim 9, wherein the database system includes a database engine and a database, the database engine processes and generates a processed data according to the user instruction, and the database engine sends the processed data to the client, the database stores data in the database, and the decision unit is linked to the database engine.

* * * * *